United States Patent [19]
da Costa et al.

[11] 3,988,836
[45] Nov. 2, 1976

[54] APPARATUS FOR MEASURING THE CONCENTRICITY OF ROTORS OF MINIATURE MOTORS WITH RESPECT TO THEIR AXIAL PIVOTS

[75] Inventors: Harry H. da Costa; Paul L. Krichbaum, both of Scottsdale, Ariz.

[73] Assignee: Motorola, Inc., Chicago, Ill.

[22] Filed: May 29, 1975

[21] Appl. No.: 581,992

[52] U.S. Cl. ............................ 33/174 Q; 33/178 E
[51] Int. Cl.² .......................................... G01B 5/25
[58] Field of Search .......... 33/172 E, 174 L, 174 Q, 33/174 M, 178 E

[56] References Cited
UNITED STATES PATENTS

| | | | |
|---|---|---|---|
| 2,408,689 | 10/1946 | Seme | 33/174 Q |
| 2,547,719 | 4/1951 | Rosser | 33/174 Q |
| 2,969,598 | 1/1961 | Voltaire et al. | 33/174 Q |
| 3,564,721 | 2/1971 | Wilson | 33/174 Q |
| 3,795,055 | 3/1974 | Zucco | 33/174 Q |

FOREIGN PATENTS OR APPLICATIONS

| | | | |
|---|---|---|---|
| 327,730 | 8/1939 | Italy | 33/174 L |

*Primary Examiner*—Richard E. Aegerter
*Assistant Examiner*—Richard R. Stearns
*Attorney, Agent, or Firm*—Harry M. Weiss; Michael D. Bingham

[57] ABSTRACT

There is disclosed an electromechanical system for measuring the concentricity of small disk magnets with respect to their axle pivots. The apparatus includes a fixture to accurately position a rotor assembly with respect to the active member of a variable reluctance transducer and a work piece for rotating the axle member while displacement measurements are being displayed on a suitable meter. The work piece for driving the rotor is designed so that no damaging forces are transmitted to the radial magnet material.

5 Claims, 5 Drawing Figures

3,988,836

APPARATUS FOR MEASURING THE CONCENTRICITY OF ROTORS OF MINIATURE MOTORS WITH RESPECT TO THEIR AXIAL PIVOTS

BACKGROUND OF THE INVENTION

This invention relates to the testing of precision components for miniature watch motors or the like and more particularly for measuring the concentricity of the rotor assembly of the miniature motor.

Large variations in the concentricity relationship between the outside diameter of the rotor and the axle pivots thereof will produce similar variations in the motor performance because the magnetic locking force is very sensitive to changes in the physical air gap or space between the rotor poles located at the periphery of the rotor and the magnetic biasing means utilized to stop the rotor in a predetermined position after energization of the miniature motor.

Thus, a need exists to provide an efficient and accurate test apparatus for measuring the concentricity of the rotor with respect to its axle pivots without any damaging forces being transmitted to the radial magnet material.

SUMMARY OF THE INVENTION

Accordingly, it is an object of this invention to provide an apparatus for measuring the concentricity of the rotor assembly of a miniature motor with respect to the axle pivots thereof.

It is another object of the invention to provide a test apparatus for measuring the concentricity of a rotor assembly without physically damaging the assembly.

It is a further object of the invention to provide a test apparatus for measuring the concentricity of the rotor assembly which is suitable to test the rotor assembly at a high production rate.

In carrying out the invention in one form, there is provided an apparatus for measuring the concentricity of a rotor assembly for a motor with respect to its axle pivots including; a test fixture for retaining the rotor assembly, the rotor assembly being rotatably retained in said test fixture, a member for rotating the rotor assembly in the test fixture in which the rotor assembly is retained, and means for measuring the concentricity of the rotor assembly such that when the rotor assembly is rotated an output signal is derived which corresponds to the concentricity of the rotor assembly thereby providing visual display for determining if the concentricity of the rotor assembly is within production tolerances.

DETAILED DESCRIPTION OF THE PREFERRED EMBODIMENT

Figure 1:
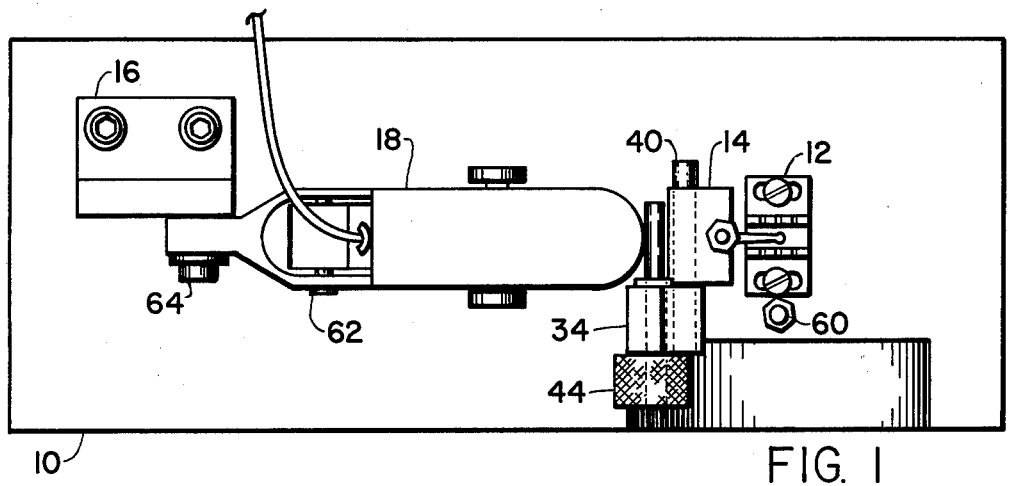
FIG. 1 is a plan view of the test apparatus of the embodiment of the invention.
Figure 2:
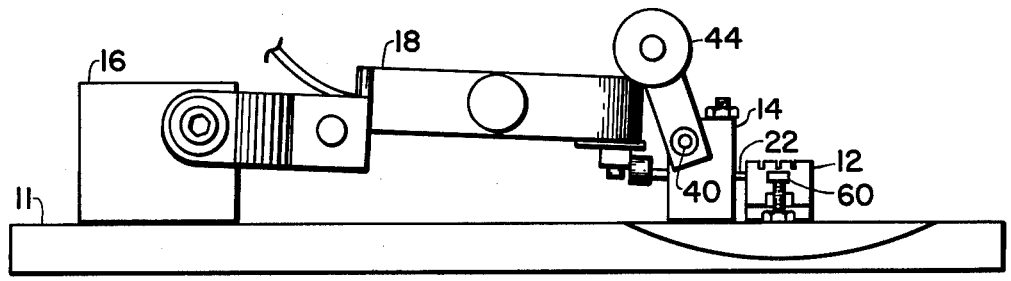
FIG. 2 is an elevational view of the test apparatus of the embodiment of the invention with the rotor driving mechanism in the up or loading position.
Figure 5:
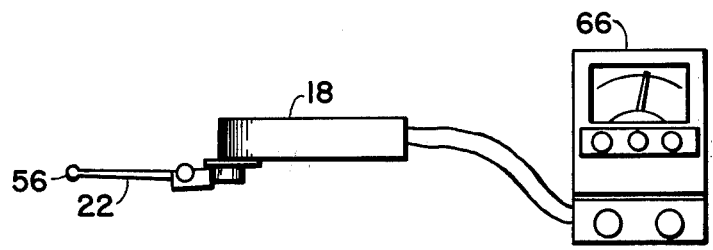
FIG. 5 is a pictorial presentation of the measuring system.
Figure 3:
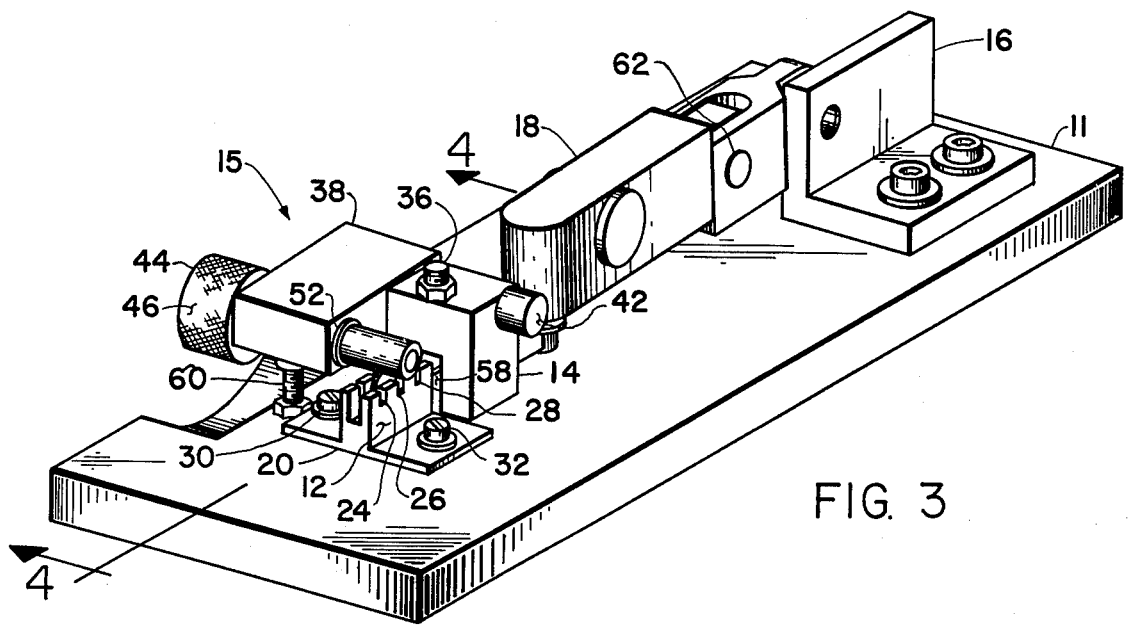
FIG. 3 is a perspective view of the test apparatus of the embodiment of the invention with the rotor driving mechanism in the down or testing position.

Referring to the illustrations, the invention is shown as comprising; base plate 10 which is rectangular in shape and to which is attached rotor positioning or retaining member 12, rotor drive mechanism member 14 and angle structure 16 (for the mounting of linear displacement transducer 18). All of the aforementioned components are constructed in a nonmagnetic material such as aluminum, brass, or a suitable rigid plastic.

Rotor positioning member 12 is comprised of a double flanged base 20 having a central vertical member which is recessed to provide the necessary clearance for the mounting of the rotor assembly and for allowing the positioning of the displacement transducer arm 22. The top face of the central vertical member is fabricated with three sets of slots 24, 26 and 28 so proportioned that the rotor assembly is constrained yet is also permitted to be rotated freely by the rotor drive mechanism 14. Only one of the sets of slots is used at any one time, the remaining slots are intended as spares for use in the event that bearing wear is too excessive.

Double flange base 20 is slotted to receive attachment screws 30 and 32 and to permit the realignment of rotor positioning member 12 in the event one of the spare slots has to be substituted because of wear.

Rotor drive mechanism base member 14 includes pivot bearing 34 about which rotor drive mechanism 15 pivots and adjustable stop 36 for limiting the height of travel of displacement transducer arm 22. Two tapped holes are provided in the base of rotor drive mechanism base member 14 for its attachment to base plate 10.

Figure 4:
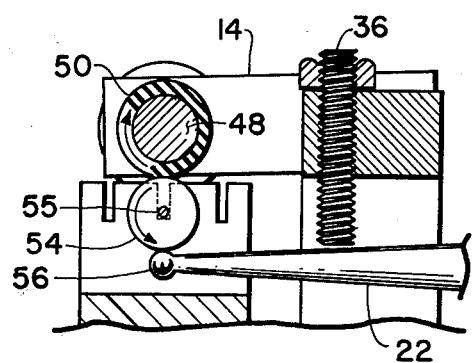
FIG. 4 is an elevational view of the rotor assembly during the measuring sequence taken in the direction of arrows 4—4 of FIG. 3.

Rotor drive mechanism 15 includes arm member 38 which is attached to base member 14 by means of pivot pin 40 and securing collar 42 and drive shaft assembly 44 located at the other end of arm member 38. Drive shaft assembly 44 comprises knob member 46, located at one end of rotor drive shaft 48, and soft rubber sleeve 50 tightly fitted to the other end of rotor drive shaft 48. Rotor drive shaft 48 is secured into arm member 38 by attachment of knob member 46 with axle restraint being effected by one end face of knob member 46 and flange-like portion 52 of rotor drive shaft 48. Rotor drive mechanism 15 when in the drive or operating position (FIG. 4) is illustrated as having soft rubber sleeve 50 resting upon the periphery of rotor assembly 54, there being sufficient friction between the soft rubber sleeve and the rotor periphery to overcome the friction components between the rotor assembly pivots, the rotor periphery, and the displacement transducer arm spherical contact point 56 interface.

Base member 14 is constructed with a centrally located slot 58 with adjustable stop 36 projecting through the top of slot 58 and making contact with displacement transducer arm 22 when the test fixture is in the loading position. Slot 58 is sized to permit adequate adjustment of displacement transducer arm 22.

Mounted into the base plate 10, adjacent to flanged base 20, is pedestal 60 which limits the height position of rotor drive mechanism 15 when it is in the operating or driving position to prevent damaging the disk magnet comprising rotor assembly 54.

Linear displacement transducer 18 together with its associated mounting member 62 is secured to angle structure 16 by suitable hardware, with major height and lateral adjustments being provided at attachment point 64. Fine adjustments are affected by controls in the body of the linear displacement transducer.

Linear displacement transducer 18 may be of the commercially available type which is suitable to provide an electrical/optical readout in response to linear motion thereof.

In operation of the embodiment of the invention, rotor assembly 54 is placed in rotor positioning member 12 and rotor drive mechanism 15 carefully lowered until soft rubber sleeve 50 is in contact with the periphery of the rotor assembly wherein the axle 55 of rotor assembly 54 is firmly retained against bearing or slot member 26 to provide an initial bias to contact point 56 of transducer arm 22. An operator rotates the rotor assembly by slowing turning knob member 44 and observes the eccentricity criteria on meter display 66 which is included as part of linear displacement transducer 18. Acceptable zones may be marked on the meter face such that rotor assemblies may be quickly and easily tested by an operator who observes if the meter display is within the acceptable zones otherwise the rotor assembly is rejected.

What has been described above is an improved apparatus and method for testing the concentricity of rotor assemblies with respect to the axle pivots. The apparatus provides quick and easy testing of the concentricity of the peripheries of the rotor of miniature motors. Thus, the subminiature rotor assemblies may be measured without physical damage thereto and at a high production rate at a nominal cost.

While the above detailed description has shown and described the fundamental novel features of the embodiment of the invention it will be apparent to those skilled in the art that any changes and modifications may be made without departing from the spirit of the invention.

What is claimed is:

1. An apparatus for measuring the concentricity of the periphery of a disk magnet rotor assembly for a miniature motor with respect to its axle pivots, including in combination:
   a base surface;
   means for rotatably retaining the axle of the rotor assembly, said retaining means being mounted on said base surface;
   means for measuring the concentricity of the rotor assembly, said measuring means being in physical contact with the rotor assembly and being responsive to eccentricities in the rotor assembly periphery when said rotor assembly is rotated such that an output signal is derived which corresponds to the concentricity of said rotor assembly to said axle pivots thereof;
   means for rotating the rotor assembly including a base member disposed on said base surface having a slot located centrally thereof through which said measuring means is disposed, an axle member disposed through said base member in generally parallel relationship to the axle of the rotor assembly when the axle is supported in the retaining means, and rotor assembly driver means pivotally attached to said axle member; and
   said rotor assembly driver means including drive shaft assembly means rotatably disposed therethrough in spaced parallel relationship to said axle member, said drive shaft assembly means being in frictional contact with the periphery of the rotor assembly during testing thereof for rotating the rotor assembly.

2. The apparatus of claim 1 wherein said retaining means includes a positioning member slidably mounted on said base surface to permit positioning of the rotor assembly with respect to said means for measuring the concentricity of the rotor assembly, said positioning member having a plurality of associated pairs of slots, the axle of said rotor assembly being disposed in one of said associated pair of slots during testing.

3. The apparatus of claim 1 wherein said measuring means includes in combination:
   an angle mounting member mounted on said base surface including a pivot bearing which is generally parallel to the axle of the rotor assembly when supported in said retaining means;
   transducer means pivotally mounted to said angle mounting member about said pivot bearing;
   said transducer means including transducer displacement means attached thereto for providing physical contact to the periphery of the rotor assembly and being responsive to the eccentricity of said rotor assembly to translate the rotational movement of said rotor assembly to linear mechanical movement whereby said output signal is derived; and
   means mounted through said base member for limiting the movement of said transducer displacement means.

4. The apparatus of claim 2 wherein:
   said rotor assembly driver means including a driver base plate, with said drive shaft assembly means being rotatably mounted through said driver base plate, said drive shaft assembly means including a pliable rubber sleeve mounted to one end thereof which makes frictional contact with the periphery of the rotor assembly under test.

5. The apparatus of claim 4 wherein said measuring means includes in combination:
   an angle mounting member attached to said base surface and including a pivot bearing which is generally parallel to the axle of the rotor assembly when the axle is supported in said retaining means;
   transducer means mounted to said pivot bearing of said angle mounting member; and
   said transducer means including transducer displacement means attached to said transducer means and disposed through said centrally located slot of said base member of said rotating means for providing physical contact to said rotor assembly and being responsive to the eccentricity of said rotor assembly to translate the rotational movement of said rotor assembly to linear mechanical movement whereby said output signal is derived.

* * * * *